R. E. ROTHE.
WIND SCREEN, PARTICULARLY FOR MOTOR VEHICLES.
APPLICATION FILED MAY 3, 1912.
1,070,539.
Patented Aug. 19, 1913.
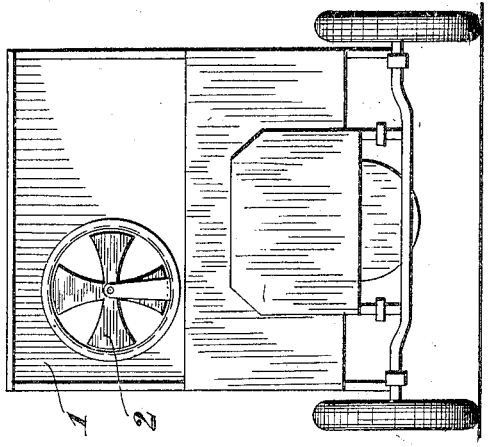
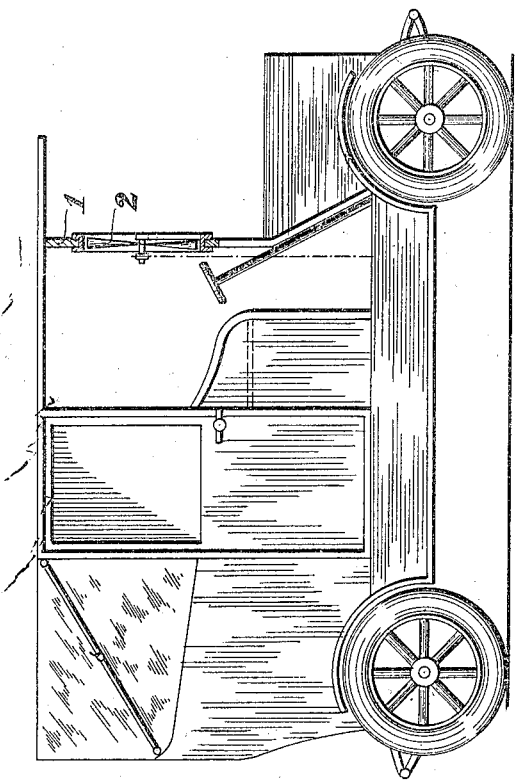
Witnesses:
E. Anderson.
F. C. Schroder.
Inventor:
Rudolph Emil Rothe
per
Lawrence Langner
Attorney.

UNITED STATES PATENT OFFICE.

RUDOLPH EMIL ROTHE, OF VIENNA, AUSTRIA-HUNGARY.

WIND-SCREEN, PARTICULARLY FOR MOTOR-VEHICLES.

1,070,539.  Specification of Letters Patent.  Patented Aug. 19, 1913.

Application filed May 3, 1912. Serial No. 694,913.

*To all whom it may concern:*

Be it known that I, RUDOLPH EMIL ROTHE, a subject of the Emperor of Austria-Hungary, residing at Kohlmarkt 7, Vienna I, in the Empire of Austria-Hungary, have invented certain new and useful Improvements in Wind-Screens, Particularly for Motor-Vehicles, of which the following is a specification.

Hitherto sheets of glass have almost invariably been used as wind screens for motor-vehicles. These sheets of glass present the defect, however, that in encountering dust, rain, snow and the like they do not afford a clear vision. If the sheet of glass is interrupted on a level with the eyes, the result is that the current of air reaches the driver so that the desired effect is not obtained. It is also already known to replace the wind screen by fans, that is to say to provide instead of protecting plates merely fans both in front of and behind the driver's seat but this arrangement does not present any considerable advantage inasmuch as, although it prevents the current of air from reaching the driver directly, very unpleasant eddy currents or drafts are produced.

In accordance with the present invention the plate of glass is provided with an opening substantially on a level with the driver's face and eyes and a fan arranged in the said recess.

By virtue of this arrangement, irrespective of the advantage that the person seated beside the driver behind the interrupted glass plate cannot in any way be affected by the draft, a much steadier motion of the air is obtained as the quantity of air driven forward by the fan in the direction in which the car is traveling is drawn from an inclosed space which the air can only enter laterally while when there is no partition direct eddy currents are formed as the air flowing around the fan in opposition to the direction of travel is suddenly deflected from its direction by the action of the fan and again driven forward in the opposite direction. With the present construction therefore there is never a complete reversal of the air current at the place at which it could be unpleasantly felt by the occupants of the vehicle the air being gradually deflected at this place so that it flows off gently. The air striking the glass plate is carried along by the draft produced by the fan, that is to say its direction is modified but this is of no importance as it is precisely at this place that the partition is located. By means of the present construction therefore clear vision is maintained during any weather and on the other hand the harmful effect of the draft is entirely avoided.

The invention is illustrated by way of example, as applied to an automobile, in the accompanying drawing wherein:

Figure 1 represents the arrangement in side elevation and Fig. 2 in front elevation.

In the embodiment of the invention illustrated the wind screen 1 as hitherto generally adopted is arranged close to the driver and provided with an opening substantially opposite his face and on a level with his eyes, the fan 2 being arranged to rotate therein, as shown. The fan may either be driven by means of suitable gear directly off the wheels or by an electric motor to which more or less current is supplied in accordance with the speed with which the car is traveling for the time being.

It is advisable to provide the fan with a free wheel hub so that the fan may not come suddenly to rest when the vehicle stops.

What I claim and desire to secure by Letters Patent of the United States is:—

In combination, a motor-vehicle, a wind screen formed with an opening located opposite the driver's seat, and a fan arranged in said opening adapted to produce an air current opposite in direction to the draft produced by the travel of said vehicle.

In testimony whereof I affix my signature in presence of two witnesses.

RUDOLPH EMIL ROTHE.

Witnesses:
ADA MARIA BERGER,
AUGUST FUGGER.

Copies of this patent may be obtained for five cents each, by addressing the "Commissioner of Patents, Washington, D. C."